United States Patent
Banaszek et al.

(10) Patent No.: US 11,139,897 B2
(45) Date of Patent: Oct. 5, 2021

(54) RECEIVER FOR RECEIVING INFORMATION TRANSMITTED USING VERY WEAK LIGHT PULSES, A SYSTEM FOR TRANSMITTING INFORMATION COMPRISING SUCH A RECEIVER AND A METHOD FOR TRANSMITTING INFORMATION USING VERY WEAK LIGHT PULSES

(71) Applicant: Uniwersytet Warszawski, Warsaw (PL)

(72) Inventors: Konrad Banaszek, Warsaw (PL); Michał Jachura, Warsaw (PL)

(73) Assignee: UNIWERSYTET WARSZAWSKI, Warsaw (PL)

( * ) Notice: Subject to any disclaimer, the term of this patent is extended or adjusted under 35 U.S.C. 154(b) by 0 days.

(21) Appl. No.: 16/759,883

(22) PCT Filed: Oct. 27, 2018

(86) PCT No.: PCT/IB2018/058421
§ 371 (c)(1),
(2) Date: Sep. 8, 2020

(87) PCT Pub. No.: WO2019/087029
PCT Pub. Date: May 9, 2019

(65) Prior Publication Data
US 2021/0091859 A1     Mar. 25, 2021

(30) Foreign Application Priority Data
Oct. 30, 2017   (PL) .......................................... 423300

(51) Int. Cl.
*H04B 10/67*    (2013.01)
*H04B 10/524*   (2013.01)
(Continued)

(52) U.S. Cl.
CPC ......... *H04B 10/671* (2013.01); *H04B 10/524* (2013.01); *H04B 10/532* (2013.01); *H04B 10/70* (2013.01); *H04B 10/118* (2013.01)

(58) Field of Classification Search
CPC .. H04B 10/671; H04B 10/524; H04B 10/532; H04B 10/70; H04B 10/118
See application file for complete search history.

(56) References Cited

U.S. PATENT DOCUMENTS

| | | | | |
|---|---|---|---|---|
| 7,899,279 B2 * | 3/2011 | Nasu | .................... | H04B 10/676 385/14 |
| 8,180,226 B2 * | 5/2012 | Mure | ................... | H04B 10/677 398/202 |
| 2012/0177385 A1 * | 7/2012 | Guha | .................... | H04B 10/70 398/202 |

OTHER PUBLICATIONS

International Search Report in PCT/IB2018/058421 dated Feb. 22, 2019.

(Continued)

*Primary Examiner* — Mina M Shalaby
(74) *Attorney, Agent, or Firm* — Ralph E. Jocke; Walker & Jocke (57) ABSTRACT

Exemplary arrangements relate to receivers for receiving information using very weak light pulses. The exemplary arrangements include an input optical signal having a sequence of light pulses, optical elements, and a detector. The optical elements include at least one polarisation modulator, at least one polarisation splitting cube, an element with a different optical path length for different polarisations, and at least one polarization rotating plate. Part of the optical signal follows a shorter optical path length, and part of it follows a longer optical path length. The element with different optical path lengths is placed between two polarisation beam splitter cubes. The beam splitter cubes split and then merge the sequence of pulses reducing the sequence by half and forming an amplified signal readable by the detec- (Continued)

tor. Exemplary arrangements also relate to a method for transmitting information using the exemplary arrangement.

20 Claims, 8 Drawing Sheets

(51) Int. Cl.
*H04B 10/532* (2013.01)
*H04B 10/70* (2013.01)
*H04B 10/118* (2013.01)

(56) References Cited

OTHER PUBLICATIONS

Written Opinion of International Search Authority in PCT/IB2018/058421.
International Preliminary Report on Patentability in PCT/IB2018/058421 dated Oct. 22, 2019.

* cited by examiner

RECEIVER FOR RECEIVING INFORMATION TRANSMITTED USING VERY WEAK LIGHT PULSES, A SYSTEM FOR TRANSMITTING INFORMATION COMPRISING SUCH A RECEIVER AND A METHOD FOR TRANSMITTING INFORMATION USING VERY WEAK LIGHT PULSES

TECHNICAL FIELD

The exemplary arrangements relate to a receiver for receiving information transmitted using very weak light pulses. The exemplary arrangements also relate to a system consisting of at least two modules for transmitting information over great distances. The exemplary arrangements are found useful in widely understood satellite communication, telecommunication, optics and transmission of weak electromagnetic pulses over great distances, including deep space.

BACKGROUND

In prior art, a known and one of the most frequently used signal modulation techniques in satellite communication is the Pulse Position Modulation (PPM). Due to the heterogeneous distribution of optical power within the frame of a single PPM symbol, this technique requires very high instantaneous power of the laser installed in the transmitter. Standard architecture of a satellite transmitter realises PPM modulation by cutting optical pulses out of a continuous operation laser by means of an electrooptical amplitude modulator and the subsequent amplification of pulses using, e.g. erbium optical amplifiers as described in D. O. Caplan, "Laser communication transmitter and receiver design", *J. Opt. Fib. Commun. Rep.*, 2007, 4, 225-362, which is incorporated herein by reference in its entirety. The speed of transmission in such a solution may reach up to several megabits per second and it is limited primarily by the speed of the used amplitude modulator. Due to the low instantaneous power of several watts, this solution enables optical transmission of information only over relatively short distances, such as Earth-low Earth orbit, Earth-geostationary orbit or Earth-Moon as described in M. Toyoshima et al., "*Current status of research and development on space laser communications technologies and future plans in NICT*", 2015 IEEE ICSOS, New Orleans, La., pages 1-5, (October 2015), which is incorporated herein by reference in its entirety.

In order to realise the PPM protocol over distances enabling communication with deep space, instantaneous optical powers in the order of kilowatts ($10^3$ W) are required. In the currently used solutions they are reached by modulating the quality factor of the resonating cavity of laser (Q-switching) as described in H. Hemmati, Deep-Space Optical Communication, Chapter 5: Flight Transceiver, Wiley, October 2005, which is incorporated herein by reference in its entirety. Unfortunately, the cavity modulation frequency is limited to several hundred kilohertz (kHz), which decreases the achievable speed of transmission considerably. In addition, the efficiency of conversion of electrical into optical power in this solution is low, and in the case of the most efficient systems amounts to 10-15%. High instantaneous powers on the part of the transmitter are also associated with problems with heat dissipation, as well as the risk of damaging fibre optical elements.

A promising solution permitting a decrease in the instantaneous power of the laser installed in the transmitter involves the use of structured optical receivers. In this solution optical energy is split into a number of pulses which are subsequently merged in the receiver where the measurement takes place. When the power of received signals becomes very low, the so-called superadditivity phenomenon occurs, consisting in the fact that a combined measurement of several pulses provides more information than if all the pulses were measured separately.

A canonical example of a structured receiver has been described in US patent document US20120177385A, which is incorporated herein by reference in its entirety, in which a system of linear optics with n input ports and n output ports enabling the conversion of a sequence of optical pulses with specified phase relationships into a spatial PPM format was proposed. Unlike the present solution, this system requires for each of the optical pulses forming a sequence to enter a different input port. Similar, each of PPM output symbols appears on one of "n" output ports instead of one, like in the present solution. If all pulses propagated collinearly, the solution presented in the document would additionally require active redirecting of the individual pulses entering and leaving the device.

There is also known US patent document U.S. Ser. No. 14/981,175A, which is incorporated herein by reference in its entirety, in which the transmission of information is realised by means of phase modulation of a continuous operation laser, subsequently amplified in accordance with the architecture described at the beginning of the chapter. Unlike the present solution, in this patent document each of the modulated fragments of the signal is recorded separately and there is no subsequent conversion of the phase-modulated signal into the PPM format.

In prior art there are very numerous known examples of systems using radio or microwave band for satellite communication (e.g. U.S. Pat. No. 3,710,255A, U.S. Ser. No. 13/116,403A, both of which are incorporated herein by reference in their entirety). This range of electromagnetic radiation (0.5 GHz-20 GHz) is currently used both in Earth-Orbit communication, as well as in missions realised by space probes or Mars rovers. The increasing demand for the speed of transmission of data collected by devices exploring space has caused an increasing interest in optical communication, which is believed to be the future of satellite communication as described in D. Powell, "*Lasers boost space communication*" Nature, 2013, 499, 266-267, which is incorporated herein by reference in its entirety. The main cause of such interest is the considerably broader band of transmission offered by optical communication, which according to the Shannon-Hartley theorem as described in E. Desurvivre, "*Classical and quantum information theory*" Cambridge University Press, 2009, which is incorporated herein by reference in its entirety, allows increasing data transmission speed by several orders of magnitude.

Laser communication has previously been used for connections between satellites in space and radio communication from space to Earth as described in Z. Sodnik and M. Sans, Proc. International Conference on Space Optical Systems and Applications (ICSOS) 2012, 13-2, Ajaccio, Corsica, France, 9-12 Oct. 2012, which is incorporated herein by reference in its entirety. In order to improve the stability of laser link from space to Earth, there is a known method of compensating the distortions of signals caused by atmospheric conditions using adaptive optics or the use of a multi-mode receiver which accepts signal distorted, for example, by atmospheric turbulences.

It has previously been proposed that the use of a correcting subsystem in the form of a system of lenses or a dielectric block with a properly chosen refraction coefficient will to increase the acceptance angle of a beam of light directed into the receiver as described in J. Jin, S. Agne, Jean-Philippe Bourgoin, Y. Zhang, N. Lütkenhaus, T. Jennewein, Physical Review A 97, 043847 (2018), which is incorporated herein by reference in its entirety. An increased acceptance angle allows efficient operation of the receiver even when the input beam of light undergoes wavefront distortions caused, for example, by atmospheric turbulence.

The major problem of optical satellite communication over great distances is the effective generation of modulated signals in the PPM format with very high instantaneous power. In addition, strong PPM pulses cannot be generated efficiently by means of amplitude modulation of a continuous operation laser, while the available pulse lasers are characterised by low efficiency of converting electrical to optical power.

Receivers for receiving information transmitted using light may benefit from improvements.

DISCUSSION

The exemplary arrangements relate to the transmission of information using polarisation-phase sequences of pulses generated by means of a modulated continuous operation laser, which are converted in the receiver into the standard pulse position modulation format. Due to optical interference proceeding in multiple stages in the exemplary receiver, the energy carried by the sequence of pulses is concentrated in a single pulse. This allows increasing the ratio of instantaneous optical power to the average power in the transmission of optical information over great distances, at the same time maintaining high efficiency of conversion of electrical into optical energy, resulting from the use of a continuous operation laser.

The exemplary arrangements, in some instances, include a receiver for receiving information using very weak light pulses, comprising an input, optical elements and a detector (SPD), wherein the input comprises an optical signal having a sequence of very weak light pulses, wherein the receiver comprises at least one module (T), wherein the at least one module (T) comprises at least one polarisation splitting element, an element with a different optical path length for each of the split polarisations, and at least one plate rotating the polarisation (HWP, QWP), wherein part of the optical signal following a shorter, and part of it a longer optical path length, wherein the polarisation splitting element is a polarisation beam splitter (PBS) cube, wherein the element with a different optical path length for each of the split polarisations is placed between two polarisation beam splitter (PBS) cubes, and wherein the module (T) comprises at least one polarisation modulator (PolM).

In some exemplary arrangements, the plate rotating the polarisation may be a half-wave plate (HWP) or a quarter-wave plate (QWP).

In some exemplary arrangements, the receiver is operable for digital modulation of an analogue signal (PPM).

In some exemplary arrangements, the receiver is operable for recording weak optical signals over great distances.

In some exemplary arrangements, at the output of the receiver system a detector of single photons (SPD) is placed for the detection of the optical signal.

In some exemplary arrangements, the wavelength of optical signals is within a range of 600-1700 nm. In alternative exemplary arrangements, the wavelength of optical signals is within a range of 700-900 or 1100-1600 nm, and in other alternative exemplary arrangements, the wavelength of optical signals is within a range of 1500-1600 nm.

In some exemplary arrangements, the module (T) comprises at least one correcting subsystem, that increases the acceptance angle of the receiver. In some exemplary arrangements the correcting subsystem is at least one of a dielectric block with a proper refraction coefficient and a 4f system of lenses.

Another object of the exemplary arrangements is a method for transmitting information using very weak light pulses, the method comprising:

in a receiver, splitting an input optical signal comprised of a sequence of light pulses having at least two different polarisations into at least two optical signals comprised of light pulses with different polarisations;

subsequently, delaying the optical signal with one of the split polarisations with respect to the optical signal with the other polarisation;

subsequently, merging the split optical signals and amplifying the optical signals due to interference;

subsequently, recording the merged optical signals in a detector (SPD), and prior to splitting the sequence of light pulses having at least two different polarisations, rotating the polarisation of each of the light pulses using a polarisation modulator (PolM), regardless of the input sequence, by +90° or −90°.

In some exemplary arrangements, upon splitting the sequence of light pulses having at least two different polarisations into at least two optical signals, rotating the polarisations of each of the light pulses.

In some exemplary arrangements, subsequent to merging the at least two optical signals with different polarisations, rotating the polarisations of the merged optical signals.

In some exemplary arrangements, operating the receiver to map a sequence of optical pulses modulated in accordance with Hadamard codewords into the PPM format.

Exemplary arrangements also encompass a receiver for receiving information using very weak light pulses, which comprises an input, optical elements and a detector, wherein it comprises at least one module, which comprises at least one polarisation splitting element, an element with a different optical path length for each of the split polarisations, and at least one plate rotating the polarisation.

In exemplary arrangements, the element with a different optical path length for each of the split polarisations is placed between two polarisation beam splitter (PBS) cubes, part of the optical signal following a shorter, and part of it a longer optical path length.

In exemplary arrangements, the module comprises at least one polarisation modulator (PolM).

In exemplary arrangements, the plate rotating the polarisation may be a half-wave plate (HWP) or a quarter-wave plate (QWP).

In exemplary arrangements, the receiver is used for digital modulation of an analogue signal (PPM).

In exemplary arrangements, the receiver is used to record weak optical signals over great distances.

In exemplary arrangements, a detector of single photons for the detection of an optical pulse is installed at the output of the receiver system.

In exemplary arrangements, the wavelength of optical signals is within a range of 600-1700 nm, a range of 700-900 or 1100-1600 nm, or within a range of 1500-1600 nm.

In exemplary arrangements, the at least one module comprises at least one correcting subsystem, increasing the acceptance angle of the receiver. In some exemplary arrangements, the correcting subsystem is at least one of a dielectric block with a proper refraction coefficient and a 4f system of lenses.

The disclosure also relates to exemplary arrangements of a system for transmitting information using very weak light pulses, comprising a transmitter and a receiver, wherein the receiver comprises at least one module which comprises at least one polarisation splitting element, an element with a different optical path length for each of the split polarisations and a half-wave plate rotating the polarisation (HWP).

Exemplary arrangements also relate to a method for transmitting information using very weak light pulses, wherein, in the exemplary receiver, an input optical signal comprised of a sequence of light pulses having at least two different polarisations is split into at least two optical signals comprised of light pulses with different polarisations; subsequently, the signal with one of the split polarisations is delayed with respect to the optical signal with the other polarisation, upon which the split optical signals are merged and undergo amplification due to interference, and subsequently the merged signals are recorded in a detector.

In exemplary arrangements, upon splitting the sequence of light pulses having at least two different polarisations into at least two optical signals, the polarisations of each of the light pulses are rotated.

In exemplary arrangements, the at least two optical signals having different polarisations are merged, and subsequently the polarisations of the merged optical signals are rotated.

In exemplary arrangements, prior to splitting the sequence of light pulses having at least two different polarisations, the polarisation of each of the light pulses is rotated using a polarisation modulator regardless of the input sequence by +90° or −90°.

In exemplary arrangements, the receiver is operative to map a sequence of optical pulses modulated in accordance with Hadamard codewords into the PPM format.

The exemplary arrangements allow an effective increase of the ratio of instantaneous power to average power in a receiving device for optical communication using laser radiation, maintaining high efficiency of converting electrical into optical energy in the transmitter.

The exemplary arrangements are found useful in transmitting weak signals over great distances, e.g. in the space sector, in satellite communication systems (for transmitting data from a satellite to a ground receiver), telecommunication, as well as optics and other thematically associated areas.

DETAILED DESCRIPTION

In the present description, the used terms have the following meanings. Terms not defined in the present document have the meaning understood by a person skilled in the art in the light of the best possessed knowledge, the present disclosure and the context of the patent application description.

The term "BPSK" stands for the simplest form of PSK modulation (Phase Shift Keying), in which the phase can take on one of two values shifted with respect to each other by 18°, representing a logical "0" or "1" (Binary Phase Shift Keying).

The term "guard time" stands for a guard time which equals the total duration of the sequence of pulses by which the individual frames of the signal are separated. The guard time is used for temporal synchronisation of the transmitter and the detector, due to which it is an indispensable and standard element in pulse position modulation. For comparison and better understanding see FIG. 3.

The term "acceptance angle" stands for the greatest angle between the optical axis of a receiver and the beam of optical input signal for which signal detection is possible.

The term "QWP" stands for a quarter-wave plate, upon passing through which the light can change its polarisation. Along a path equalling the plate thickness, light with the direction of polarisation being in compliance with the direction of the fast axis overtakes light with the direction of polarisation being in compliance with the direction of the slow axis by a quarter of the wavelength.

The term "HWP" stands for half-wave plates rotating polarisation by 45°.

The term "PBS" stands for polarisation beam splitter.

The term "PPM" stands for a type of digital modulation of analogue signal (Pulse Position Modulation). Pulse position modulation proceeds proportionally to the instantaneous value of analogue signal by shifting the pulse relative to a reference position.

The term "visibility" relates to the visibility of interference describing the interference of optical signals. The visibility of interference is defined as $(I_{max}-I_{min})/(I_{max}+I_{min})$, wherein $I_{max}$ is the maximum signal intensity value after optical interference (in the so-called bright fringe), while $I_{min}$ is the minimum signal intensity value after optical interference (in the so-called dark fringe). When optical beams are perfectly coherent, the visibility of interference takes on a value of 1; on the other hand, when the beams are completely incoherent, the visibility of interference takes on a value of 0.

The following example embodiments are presented only in order to illustrate the exemplary arrangements, and not for their limitation, and they should not be associated with its whole scope.

In an exemplary embodiment of the disclosure, the optical power of the signal is fractioned into a sequence of pulses, which by constructive interference assemble at the receiver side into a single pulse using a properly designed structured receiver. The conversion of pulses into a single pulse takes place in an exemplary system presented in FIG. 2.

Figure 1:
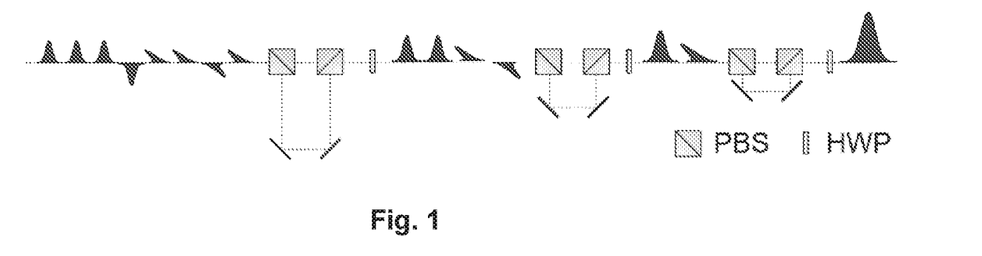
FIG. 1 is an exemplary arrangement of an exemplary receiver for receiving information transmitted using very weak light pulses.
Figure 2:
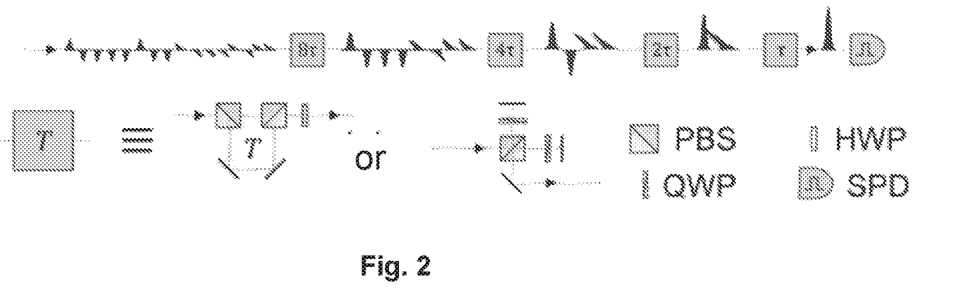
FIG. 2 is an exemplary conversion of a sequence of optical pulses with properly chosen polarisations and phases into a single optical pulse, realised by means of an exemplary system of linear optics consisting of polarisation beam splitter (PBS) cubes, half-wave plates (HWP) rotating the polarisation by 45° and optical delay lines.

Each one of the exemplary modules "T" of the exemplary system presented in FIG. 2 delays in time pulses polarised horizontally with respect to pulses polarised vertically, superimposing them over each other. Upon leaving the exemplary module, the interfered light forms a new sequence with half the number of pulses, polarised at an angle of ±45°. Afterwards, their polarisation is rotated by 45° using a half-wave plate so that, when entering a subsequent module, the pulses would be polarised again in the horizontal and vertical directions. Upon using a proper number of exemplary modules, the whole energy carried by a sequence of optical pulses is cumulated in a single pulse, which, due to its high power, is easily recorded, e.g. by means of an avalanche photo diode. The pulse position modulation, which is used to code the transmitted information, is realised by shifting in time the whole sequence of pulses, which is presented in FIG. 3. In order to avoid overlapping of sequences of pulses in time, the individual signal frames are separated by a guard time which equals the total duration of a sequence of pulses. The guard time is used for temporal synchronisation of the transmitter and the detector, due to which it is an indispensable and standard element in pulse position modulation.

Exemplary Embodiment 1

An Exemplary Passive System for Transmitting Information

The first proposed exemplary embodiment of the disclosure allows decreasing the ratio of optical instantaneous power to the average power on the part of the transmitter and involves generating a phase-polarisation sequence of pulses extending in time over all possible locations of the PPM pulse. Adequate selection of the phase and polarisation of individual pulses allows converting the sequence into a single pulse coding information in the PPM format, using an optical system consisting of passive elements only.

An exemplary system converting a sequence of $2^m$ pulses for m=4 is presented in FIG. 2. The conversion of pulses takes place in exemplary modules connected in series (marked as grey squares) described by the time delay "T". An exemplary receiver consists of "m" exemplary modules with a decreasing time delay of $2^{m-1}\tau,::2\tau:1\tau$, where $\tau$ stands for the duration of a single PPM window. Upon entering the exemplary module, horizontal polarisation is delayed with respect to vertical polarisation, so that the sequence of optical pulses would be shortened two times. By interfering coherently with each other, the pulses leave the polarising delay line in diagonal or antidiagonal polarisation, which by means of a half-wave plate is rotated into horizontal and vertical polarisation. Having passed through a single exemplary module, the sequence of pulses is shortened two times, while the power of each pulse is increased two times.

Figure 3:
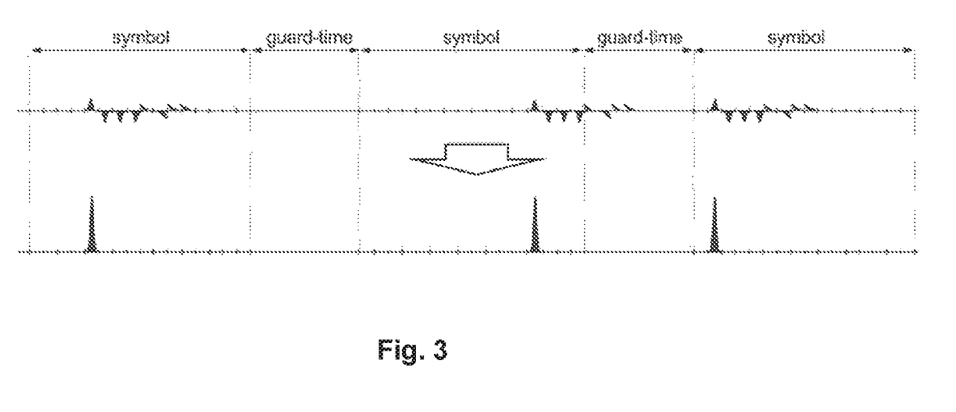
FIG. 3 is an exemplary method for coding information in communication by means of the duration of sending sequences of optical pulses with properly chosen phases and polarisations.

Having passed through "m" exemplary modules, the energy of the whole sequence is concentrated in a single pulse, time of arrival of which is determined by the time of transmitting the whole sequence. The time of arrival of a single pulse may be measured by means of an exemplary standard detector of single photons, for example, an avalanche photo diode. In exemplary arrangements, coding of information in the PPM format proceeds by transmitting a sequence of pulses within suitable time, as shown in FIG. 3. In order to avoid overlapping the consecutive sequences of pulses in time, they must be split by a guard time with a length equal to or greater than the duration of the sequence.

The easiest method of understanding how the exemplary system of a passive receiver is capable of converting a sequence of pulses into a single pulse is to analyse the operation of the system in the opposite way (from the right side to the left side). When a single optical pulse of high power enters the system from the right side, it is split in each module into sequences of pulses with a specified phase and polarisation. So far, this operating mode of the system has been used to emulate measurements with a resolution of the number of photons by means of single photons detectors as described in D. Achilles et al. "*Fiber-assisted detection with photon number resolution*", Opt. Let., 2003, 28, 2387-2389, which is incorporated herein by reference in its entirety.

The polarisation-phase sequences of pulses can be generated using a beam of continuous operation laser polarised at an angle of 45° and two phase modulators modulating horizontal and vertical polarisation, respectively. In order to maintain proper guard time, the beam must be blocked between consecutive sequences, e.g. by means of an exemplary amplitude modulator (e.g. EOSpace AX-1x2-0MVS-40-PFA-PFA), which makes the transmitter effectively use 50% of available optical power.

Similar to standard protocols of optical transmission, in the presented exemplary system it is possible to double the speed of information transmitting, if the transmitter generates simultaneously two sequences of pulses corresponding to orthogonal polarisations of a single pulse at the output of the system.

During the transmission of signal, horizontal and vertical polarisation should be replaced with circular polarisation, left and right (e.g. by means of a quarter-wave plate), so as to enable communication regardless of the mutual angular orientation of the transmitter and receiver.

FIG. 2 presents two exemplary alternative variants of delaying lines. The first one of them in an exemplary system resembling a Mach-Zehnder interferometer, the second one of them in an exemplary system of a Michelson interferometer with two quarter-wave plates (QWP). The optical power at the system output is concentrated in a single pulse carrying information coded in the PPM format, allowing efficient detection of the signal. FIG. 2 presents scalable architecture of a passive system enabling the conversion of a single sequence of pulses with a length of $2^m$ for m=4. Each of the "m" delaying modules marked by a square field with a defined delay of "T" consists of a polarisation delay line and a half-wave plate.

FIG. 3 presents an exemplary method for coding information in communication by means of the duration of sending sequences of optical pulses with properly chosen phases and polarisations. The exemplary converter presented in FIG. 2 changes the sequence into a single pulse, time of arrival of which depends on the time of sending a sequence similar to the standard pulse position modulation. The dead time (also called the guard time) between signal frames ensures that the two consecutive sequences of pulses do not overlap in time. In the presented exemplary scheme, the ratio of peak to average power is increased eight times.

Exemplary Embodiment 1A

Figure 7:
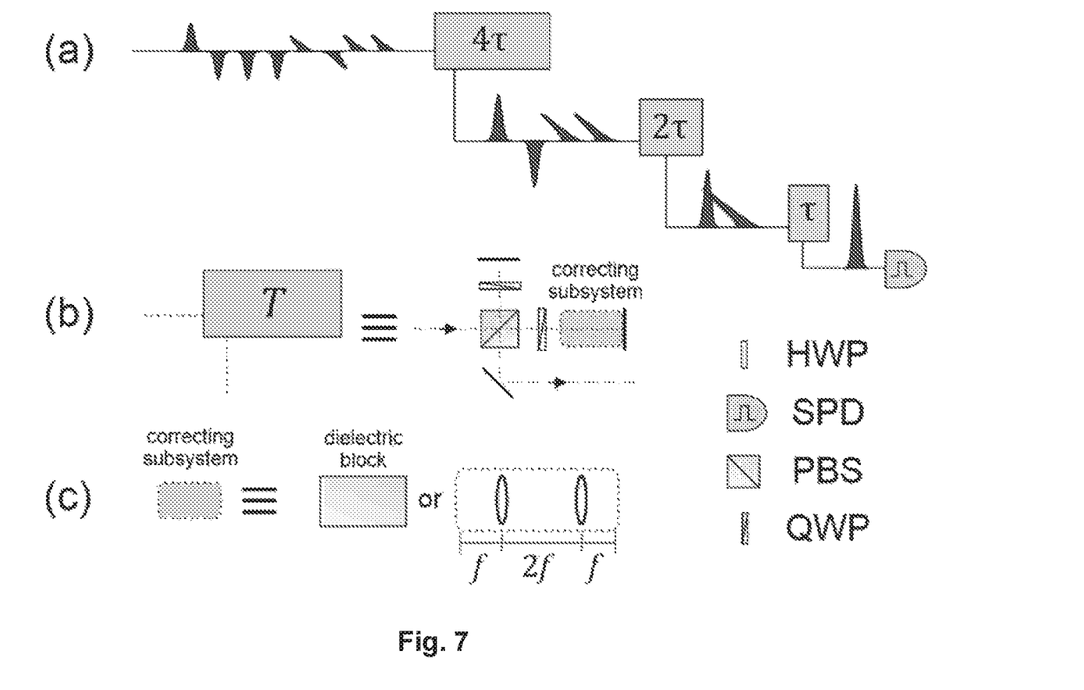
FIG. 7 is an exemplary alternative embodiment of a passive system for transmitting information with an increased acceptance angle of the receiver.

An Exemplary Alternative Embodiment of a Passive System for Transmitting Information Comprising a Correcting Subsystem, Increasing the Acceptance Angle of the Signal by the Receiver An exemplary alternative embodiment of a passive system for transmitting information is presented in FIG. 7, which consists of three points (a-c).

FIG. 7 point (a) presents an exemplary general scheme of the conversion of a sequence of optical pulses with properly selected polarisations and phases into a single optical pulse realised by means of an exemplary system of linear optics. The conversion of pulses takes place in connected exemplary modules (marked as grey rectangles) described by time delay. Each exemplary module shortens the sequence of pulses by a half, at the same time increasing the optical energy of each one of the output pulses twice.

In FIG. 7 point (b) an exemplary single module "T" for the temporal conversion of pulses is additionally provided with an exemplary correcting subsystem, increasing the acceptance angle of the input signal. FIG. 7 presents an exemplary new embodiment of the disclosure, consisting of one polarisation beam splitter (PBS) cube where the sequence of pulses enters, which splits pulses with different polarisations. Subsequently, pulses with different polarisations are recombined using two independent quarter-wave plates (QWP), behind which mirrors are placed. In exemplary arrangements, the distance between the PBS cube and one mirror is greater than the distance between the PBS cube and the second mirror. Different optical pathways cause both split sequences of optical pulses to return simultaneously to the same polarisation beam splitter (PBS) cube. Both split sequences of pulses reconnect in the PBS cube, where, due to constructive interference, strengthening of the individual pulses and a decrease in their number by a half occur.

Polarisations delayed with respect to each other which were separated in a PBS cube return to the same polarization beam splitter (PBS) cube—and not to the second, like in the preceding embodiment (Embodiment 1). Due to the placement of quarter-wave plates (QWP), the recombined optical signal exits by the second PBS port and it can be further processed. In exemplary arrangements, an exemplary correcting subsystem was placed in one of the arms, due to which the receiver tolerates distortions in the wavefront of signal entering the receiver, which may be the result of atmospheric turbulence.

FIG. 7 point (c) presents an exemplary embodiment of a correcting subsystem, which, for example, may be a dielectric block with a properly selected refraction coefficient, or a system of linear optics. It also presents an exemplary system of linear optics, consisting of two lenses of the same focal length being at a distance of two focal lengths apart from each other, commonly called the 4f system.

Exemplary correcting subsystems have been described in two papers which are quoted in the discussion related to prior art. In these reports, the subject of splitting polarisation does not appear. Instead of PBS, an ordinary light-splitting plate was used as described in Z. Sodnik and M. Sans, Proc. International Conference on Space Optical Systems and Applications (ICSOS) 2012, 13-2, Ajaccio, Corsica, France, 9-12 Oct. 2012, as well as J. Jin, S. Agne, Jean-Philippe Bourgoin, Y. Zhang, N. Lütkenhaus, T. Jennewein, Physical Review A 97, 043847 (2018), which both papers are incorporated herein by reference in their entirety.

Exemplary Embodiment 2

An Exemplary Active System for Transmitting Information for Hadamard Sequence

An exemplary layout of superadditive communication presented in the paper S. Guha, "*Structured Optical Receivers to Attain Superadditive Capacity*", Phys. Rev. Let., 2011, 106, 240502-1-240502-4, which has been incorporated herein by reference in its entirety, proposes the use of codewords consisting of BPSK signals, with a phase of "0" or "$\pi$", marked symbolically as "+" (plus) or "−" (minus). Exemplary codewords used for communication are subsequent rows of a Hadamard matrix with a specified order. Hadamard matrices are orthogonal symmetrical matrices which exist for orders being a natural power of two. Elements of a Hadamard matrix include only the numbers "1" or "−1". For a Hadamard matrix with an order of $2^m \times 2^m$, each row of the matrix may be unambiguously associated with a sequence of bits $b_{m-1}b_{m-2} \ldots b^1b_0$ with a length of "m", like it is presented in Table 1 for m=3. The value of individual bits defines the hierarchy of relation between individual sections of the matrix row. The sign of the selected element of a Hadamard word may be determined by multiplying all factors 1, −1 placed above it in the table. Hadamard codewords are subsequently used for phase modulation of a sequence of optical pulses in the exemplary arrangements.

Figure 4:
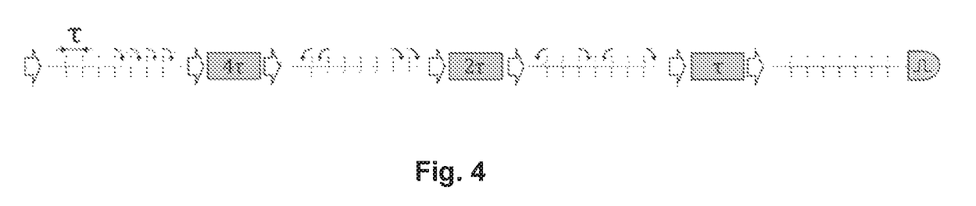
FIG. 4 is an exemplary active optical receiver converting Hadamard codewords with a length of $2^m$, consisting of BPSK symbols with a phase of ±1, into the PPM format of the order of $2^m$.
Figure 5:
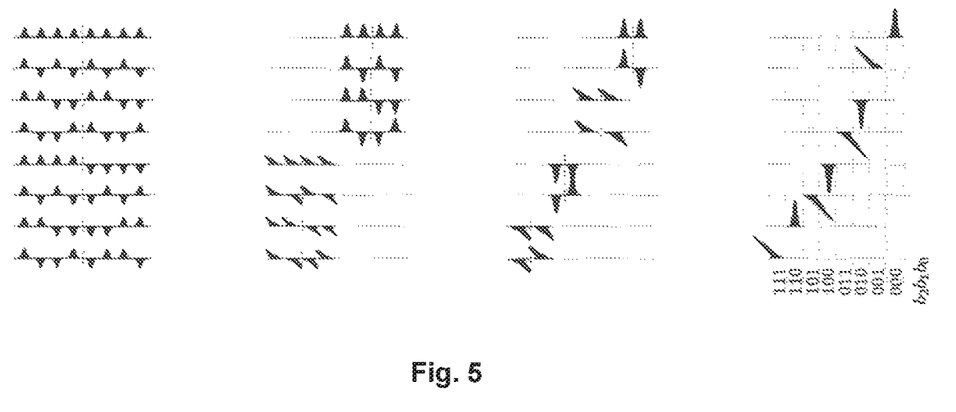
FIG. 5 is an exemplary transformation of individual Hadamard codewords upon passing through subsequent exemplary modules of an exemplary active receiver.

An exemplary system of an active receiver which enables mapping a sequence of optical pulses modulated in accordance with Hadamard codewords into the PPM format is presented in FIG. 4. Inside the exemplary receiver, the individual pulses of a sequence interfere constructively in such a manner that, at the output of the receiver, the whole optical energy is concentrated in a single pulse. The location of an output pulse in time depends on the Hadamard word according to which the sequence of pulses has been modulated. The conversion of different sequences of pulses at the individual stages of the receiver into the output PPM format is presented in FIG. 5.

Figure 6:
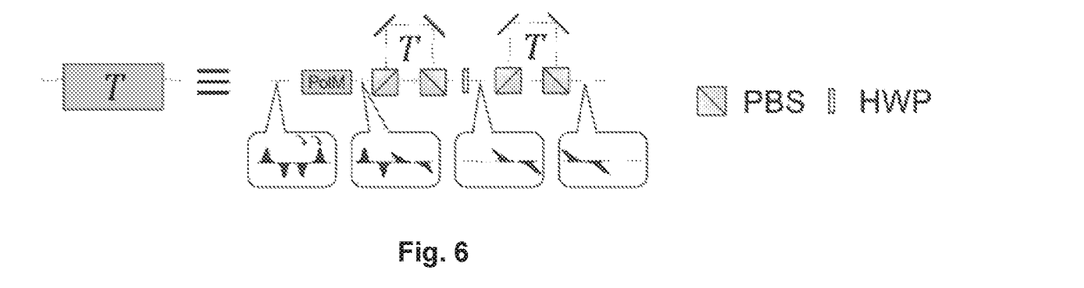
FIG. 6 is an exemplary single module of an exemplary active receiver configured for a delay of "T" in which PolM is a polarisation modulator; PBS is a polarisation beam splitter cube; HWP is a half-wave plate; and the key illustrates an exemplary transformation of an exemplary Hadamard sequence for T=2 τ.

An exemplary active system consists of modules connected in series, layout of which is presented in FIG. 6. The first element of each of the exemplary modules is a polarisation modulator which, regardless of the input sequence, rotates the polarisation of selected pulses by +90° or −90° according to the direction of arrows, in front of each of the modules presented in FIG. 4. Subsequently, pulses polarised horizontally are delayed with respect to pulses polarised vertically by a time of "T" characteristic for each module. Similar to the passive version of the receiver, the sequence of optical pulses is then shortened two times, while by coherent interference with each other, the pulses leave the polarising delay line polarised diagonally or antidiagonally. Subsequently, diagonal polarisations are changed into linear polarisations using a half-wave plate HWP. At the end of each of the exemplary modules there is a second polarisation delay line introducing a delay of "T" for horizontal polarisation.

For Hadamard codewords with a length of $2^m$, the exemplary receiver consists of "m" exemplary modules with a decreasing time delay of $2^{m-1}\tau,::2\tau:1\tau$, where $\tau$ stands for the duration of a single PPM window. Due to the above, the number of exemplary modules necessary for converting a sequence of pulses into the PPM format is scaled logarithmically with the length of the sequence. The output pulse in which the whole optical energy is concentrated appears in a position in time numbered $\Sigma_{k=0}^{m-1} b_k 2^k$, corresponding to the decimal representation of a binary sequence of bits $b_{m-1} b_{m-2} \ldots b_1 b_0$. This position can be measured by means of an exemplary standard detector of single photons. In case of failing to record a pulse in any of the expected positions, such a measurement is rejected as inconclusive analogically to standard communication patterns based on PPM modulation.

Table 1 presents an exemplary pattern of converting a sequence of bits $b_{m-1} b_{m-2} \ldots b_1 b_0$ into Hadamard codewords with a length of $2^m$ consisting of the characters of BPSK±1, for m=3. The individual characters in Hadamard codewords are applied by a product of all factors±1 placed above them in the table.

TABLE 1

| A sequence | 1 | | | | $(-1)^{b2}$ | | | |
|---|---|---|---|---|---|---|---|---|
| of bits | 1 | | $(-1)^{b1}$ | | 1 | | $(-1)^{b1}$ | |
| $b_1 b_2 b_0$ | 1 | $(-1)^{b0}$ | 1 | $(-1)^{b0}$ | 1 | $(-1)^{b0}$ | 1 | $(-1)^{b0}$ |
| 000 | + | + | + | + | + | + | + | + |
| 001 | + | − | + | − | + | − | + | − |
| 010 | + | + | − | − | + | + | − | − |
| 011 | + | − | − | + | + | − | − | + |
| 100 | + | + | + | + | − | − | − | − |
| 101 | + | − | + | − | − | + | − | + |
| 110 | + | + | − | − | − | − | + | + |
| 111 | + | − | − | + | − | + | + | − |

FIG. 4 presents an exemplary active optical receiver converting Hadamard codewords with a length of $2^m$, consisting of BPSK symbols with a phase of ±1, into the PPM format of the order of $2^m$. The exemplary embodiment presented in FIG. 4 corresponds to a value of m=3. The scalable construction of an exemplary structured receiver consists of exemplary active modules introducing delays of $2^{m-1}\tau \ldots 2\tau, \tau$, where $\tau$ stands for time separation. Curved arrows show the direction of rotation for polarisations of the individual fragments of signal realised by polarisation modulators in individual modules.

Exemplary Embodiment 2A

Figure 8:
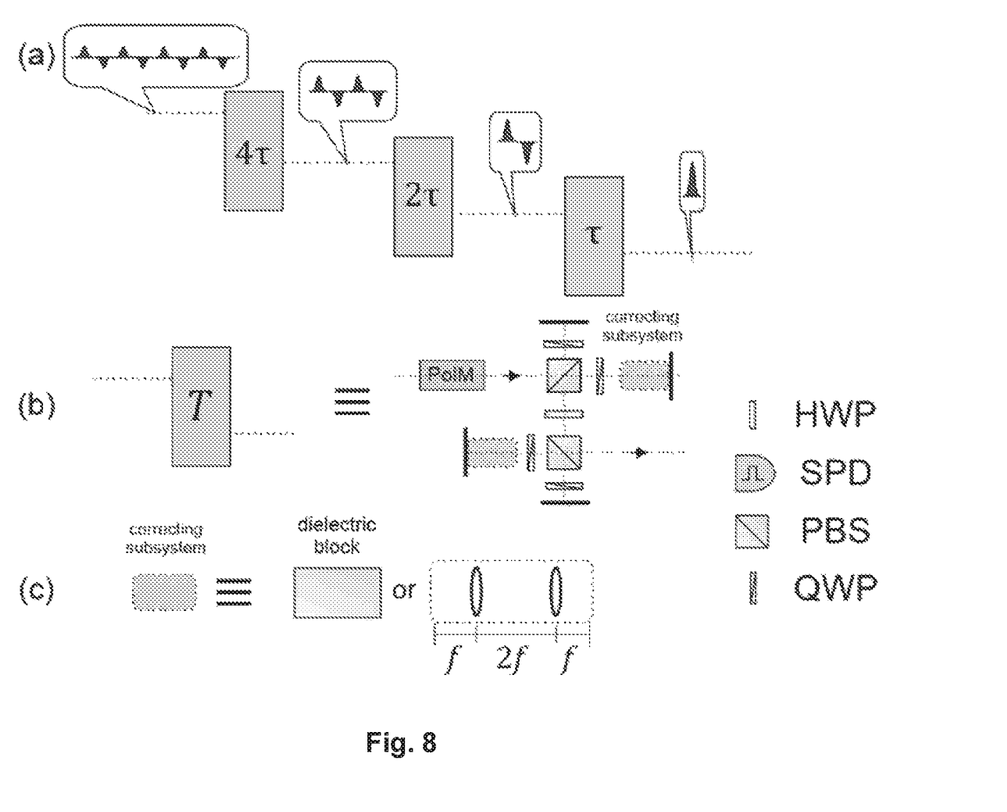
FIG. 8 is an exemplary alternative embodiment of an active system for transmitting information with an increased acceptance angle of the receiver.

An Exemplary Alternative Embodiment of an Active System for Transmitting Information Comprising a Correcting Subsystem, Increasing the Acceptance Angle of the Signal by the Receiver An exemplary alternative embodiment of an active system for transmitting information is presented in FIG. 8 which consists of three points (a-c).

FIG. 8 point (a) presents an exemplary general scheme of the conversion of a sequence of optical pulses with property selected polarisations and phases into a single optical pulse realised by means of an exemplary active system of linear optics. The conversion of pulses takes place in connected modules (marked as grey rectangles) described by time delay. In exemplary embodiments, each module shortens the sequence of pulses by a half, at the same time increasing the optical energy of each one of the output pulses twice.

In FIG. 8 point (b) an exemplary single module "T" for active temporal conversion of pulses is presented, which has been additionally provided with two exemplary correcting subsystems increasing the acceptance angle of the input signal. FIG. 8 presents an exemplary new embodiment, consisting of two polarisation beam splitter (PBS) cubes instead of four cubes (Embodiment 2). The exemplary first polarisation beam splitter (PBS) cube, where the sequence of pulses previously modulated using an electrooptical polarisation modulator (PolM) enters, splits pulses with orthogonal polarisations. Subsequently, pulses with orthogonal polarisations are recombined using two independent quarter-wave plates (QWP), behind which mirrors are placed. In exemplary arrangements the distance between the first PBS cube and one mirror is greater than the distance between the first PBS cube and the second mirror. Different optical pathways cause both split sequences of optical pulses to return simultaneously to the first polarisation beam splitter (PBS) cube. Both split sequences of pulses reconnect in the first PBS cube, where, due to constructive interference, strengthening of the individual pulses and a decrease in their number by a half occur. Upon passing through the half-wave plate (HWP), rotating the polarisation of pulses by 45°, the pulses are directed to the second PBS cube, behind which two mirrors have been placed at various distances from the cube. It is the objective of the second PBS cube, the pair of quarter-wave plates and the pair of mirrors to introduce a polarisation-dependent time delay. Both between the first PBS cube and one of the mirrors, as well as between the second PBS cube and one of the mirrors, a correcting subsystem has been placed, increasing the acceptance angle of the input signal.

FIG. 8 point (c) presents an exemplary embodiment of a correcting subsystem, which, for example, may be a dielectric block with a properly selected refraction coefficient, or a system of linear optics. It also presents an exemplary system of linear optics, consisting of two lenses of the same focal length being at a distance of two focal lengths apart from each other, commonly called the 4f system.

The demand for a high ratio of instantaneous power to average power on the part of the transmitter in a regime of optical communication over great distances may be fulfilled using the exemplary arrangements of receivers described herein. In the exemplary system of optical communication described by the present invention, the transmitter sends a sequence of coherent optical pulses modulated in terms of phase and polarisation. On the other hand, the exemplary receiver merges the received pulses, interfering them properly, so as to concentrate the whole optical energy carried by the sequence into a single pulse. In the exemplary arrangements, the information is coded in the position of the output pulse according to the pattern of standard PPM modulation. The exemplary system of the transmitter, emitting pulses described in the present patent document, is relatively easy for practical realisation unlike the construction of the exemplary receiver, which is inevitably associated with a number of technical problems, solved by the exemplary arrangements described herein.

The exemplary system of the receiver (both in the passive and the active version) is robust to spatial or time distortions of the measured optical signal, which can emerge during the propagation of pulses. A considerable progress in increasing the tolerance of the receiver to this type of distortion was made during work on free-space quantum cryptography as described in J. Jin, S. Agne, Jean-Philippe Bourgoin, Y. Zhang, N. Lütkenhaus, T. Jennewein, "*Efficient time-bin qubit analyzer compatible with multimode optical channels*", Physical Review A 97, 043847 (2018) oraz arXiv: 1509.07490, 2015, which has been incorporated by reference herein in its entirety.

Another technical challenge of optical communication is the stabilisation of polarisation delay lines with accuracy of a fraction of the wavelength, so as to guarantee high visibility of the interference of pulses (constructive or destructive) in individual positions in time. The high visibility of interference also requires mutual coherence of all pulses making up a polarisation phase sequence. This means that all distortions of the signal during propagation must proceed in time scales much slower than the duration of a single sequence.

It is also possible that the visibility of interference at the edges of individual time positions would be impaired due to the time necessary to activate/deactivate electrooptical modulators. A potential solution to this problem is the use of a pulse laser with high repetition frequency in the transmitter, allowing concentration of the energy of pulses precisely in the middle of suitable time positions, where modulators are in a stabilised state.

In the presented exemplary system of optical communication light within a range of telecommunication wavelength of about 1550 nm is possible. However, alternatively, different laser wavelength may be used, within a range of 700-900 or 1100-1600 nm. They are spectral ranges for which there are available very fast polarisation modulators (a band in the order of 10-50 GHz), as well as efficient diode lasers with a very long time of coherence. The exact wavelength of the used light may, e.g. correspond to one of Fraunhofer lines, which would allow a considerable decrease of the background level in the receiver. Within the proposed range of wavelengths they are, e.g. the lines of 759.4 nm, 849.8 nm, 854.2 nm, 866.2 nm, 1268.1 nm, 1328.4 nm, 1414.2 nm, 1477.7 nm, 1496.1 nm, 1508.4 nm. It is also possible for the used wavelength to be sufficiently distanced from spectral absorption lines of the water particle. Within the possible light wavelength range they are the lines of 718 nm, 810 nm, 1130 nm, 1380 nm.

High class laser diodes as well as modulators are offered globally only by several producers who have dominated the market of telecommunication equipment (Sumitomo—Japan, Infinera—United States, Finisar—United States, Alcatel—France). A sample producer of laser diodes whose products may be used to construct the transmitter is the Finisar company (United States), while a sample model of such a diode is Finisar S7500. Exemplary polarisation modulators with a very low half-wave voltage necessary for the construction of the exemplary receiver can be purchased from the EoSpace company (United States). An example of such a modulator is model (EoSpace PM-DV5-40-PFU-PFU-LV-UL).

Exemplary half-wave plates and exemplary polarisation beam splitter cubes necessary for the construction of the exemplary receiver are very standard optical elements produced by numerous manufacturers. Sample producers who supply such elements include the NewPort company (United States), plate 05RP02-40, cube 05BC16PC.11. A cheaper solution with still good quality involves the products of the Thorlabs company (United States), plate WPH05M-1550, cube PBS25-1550. The cheapest alternative involves Chinese companies such as Foctek Photonics Inc., producing optical elements on request. However, in their case attention should be paid to the potential inconsistency of the parameters of the delivered commodity with specifications declared by the producer.

A sample exemplary detector of single photons (SPD) enabling the detection of an optical pulse at the output of an exemplary receiver system with high time resolution is an avalanche photo diode. Photodiodes may be supplied by the IdQuantique company (Switzerland), model ID230, or the Micro Photon Devices company (Italy), model $PD-050-CTB-FC.

Thus, the exemplary arrangements described herein achieve improved operation, eliminate difficulties encountered in the use of prior receivers and systems, and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover, the descriptions and illustrations herein are by way of example and the new and useful concepts are not limited to the exact features shown and/or described.

It should further be understood that the features and/or relationships associated with one exemplary arrangement can be combined with features and/or relationships from other exemplary arrangements. That is, various features and/or relationships from various exemplary arrangements can be combined in further exemplary arrangements. The new and useful scope of the disclosure is not limited to only the exemplary arrangements shown and described.

Having described features, discoveries and principles of the exemplary arrangements, the manner in which they are constructed and operated, and the advantages and useful results attained; the new and useful features, devices, elements, arrangements, parts, combinations, systems, equipment, operations, methods, processes and relationships are set forth in the appended claims.

The invention claimed is:

1. A receiver for receiving information using light pulses, comprising an input, optical elements and a detector (SPD),
    wherein the input comprises an optical signal having a sequence of light pulses,
    wherein the receiver further comprises at least one module (T), wherein the at least one module (T) comprises at least one polarisation splitting element, an element with a different optical path length for each split polarisation, and at least one plate rotating the polarisation (HWP, QWP),
    wherein part of the optical signal follows a shorter, and part of it a longer optical path length,
    wherein the polarisation splitting element is a polarisation beam splitter (PBS) cube,
    wherein the element with a different optical path length for each split polarisation is placed between two polarisation beam splitter (PBS) cubes, and
    wherein the at least one module (T) comprises at least one polarisation modulator (PolM).

2. The receiver according to claim 1,
    wherein the at least one plate rotating the polarisation is at least one of a half-wave plate (HWP) and a quarter-wave plate (QWP).

3. The receiver according to claim 2,
    wherein the receiver is operable for digital modulation of an analogue signal (PPM).

4. The receiver according to claim 3,
    wherein the receiver is operable for recording optical signals over great distances.

5. The receiver according to claim 4,
    wherein at an output of the receiver, a detector of single photons (SPD) is placed for the detection of the optical signal.

6. The receiver according to claim 5,
    wherein the wavelength of optical signals is within a range of 600-1700 nm.

7. The receiver according to claim 6,
wherein the at least one module (T) comprises at least one correcting subsystem,
wherein the at least one correcting subsystem increases an acceptance angle of the receiver, wherein the at least one correcting subsystem is at least one of a dielectric block with a refraction coefficient and a 4f system of lenses.

8. A method for transmitting information using light pulses, the method comprising:
in a receiver, splitting an input optical signal comprised of a sequence of light pulses having at least two different polarisations into at least two optical signals comprised of light pulses with different polarisations;
subsequently, delaying the optical signal with one of the split polarisations with respect to the optical signal with the other polarisation,
subsequently, merging the optical signals and amplifying the optical signals due to interference;
subsequently, recording the merged optical signals in a detector (SPD); and
prior to splitting the sequence of light pulses having at least two different polarisations, rotating the polarisation of each of the light pulses using a polarisation modulator (PolM), regardless of the input sequence, by +90° or −90°.

9. The method according to claim 8, further comprising:
upon splitting the sequence of light pulses having at least two different polarisations into at least two optical signals, rotating the polarisations of each of the light pulses.

10. The method according to claim 8, further comprising:
subsequent to merging the at least two optical signals with different polarisations, rotating the polarisations of the merged optical signals.

11. The method according to claim 9,
operating the receiver to map a sequence of optical pulses modulated in accordance with Hadamard codewords into the PPM format.

12. The receiver according to claim 1,
wherein the at least one module further comprises at least one correcting subsystem,
wherein the at least one correcting subsystem increases an acceptance angle of the receiver.

13. The receiver according to claim 2,
wherein the at least one module further comprises at least one correcting subsystem,
wherein the at least one correcting subsystem increases an acceptance angle of the receiver.

14. The receiver according to claim 5,
wherein the at least one module further comprises at least one correcting subsystem,
wherein the at least one correcting subsystem increases an acceptance angle of the receiver.

15. The receiver according to claim 1,
wherein the detector comprises a single photon detector,
wherein the single photon detector is operatively arranged at an output of the receiver, and
wherein the single photon detector is operative to detect the optical signal.

16. The receiver according to claim 3,
wherein the detector comprises a single photon detector,
wherein the single photon detector is operatively arranged at an output of the receiver, and
wherein the single photon detector is operative to detect the optical signal.

17. The receiver according to claim 1,
wherein the wavelength of light pulses is within a range of 600-1700 nm.

18. The method according to claim 8, further comprising:
subsequent to merging the at least two optical signals with different polarizations, rotating the polarizations of the optical signals.

19. The method according to claim 8, further comprising:
operating the receiver to map the sequence of light pulses modulated in accordance with Hadamard codewords into the PPM format.

20. A receiver for receiving information using light pulses, comprising
an input,
wherein the input includes an optical signal having a sequence of light pulses,
optical elements,
wherein the optical elements are operatively connected,
a single photon detector,
wherein the single photon detector is operative to read the optical signal, and
wherein the optical elements are in operative connection with the single photon detector,
wherein the optical elements include
at least one polarization modulator,
wherein the at least one polarization modulator is operative to change the polarization of the light pulses,
at least one polarization beam splitter cube,
wherein the at least one polarization beam splitter cube is operative to separate light pulses based on their polarization,
a first optical path and a second optical path,
wherein the first optical path has a longer path length than the second optical path, and
wherein the first and second optical paths are in operative connection with, and operatively arranged between a first polarization beam splitter cube and a second polarization beam splitter cube,
at least one polarization rotating plate,
wherein the at least one polarization rotating plate is operative to rotate the polarization of a light pulse,
wherein upon entrance of the optical signal into the receiver,
the polarization modulator operatively changes the polarization of light pulses to at least one of a horizontal polarization and a vertical polarization,
the first polarization beam splitter cube separates the horizontally polarized light pulses from the vertically polarized light pulses, and causes the horizontally polarized light pulses to follow the first optical path and the vertically polarized light pulses to follow the second optical path,
the second polarization beam splitter causes the horizontally polarized light pulses and the vertically polarized light pulses to be operatively combined to form a single diagonally polarized light pulse,
the at least one polarization rotating plate rotates the one single diagonally polarized light pulse to an operative rotational direction, and
the single photon detector reads the one single light pulse in the operative rotational direction.

* * * * *